(12) United States Patent
Bosshart

(10) Patent No.: US 7,315,540 B2
(45) Date of Patent: Jan. 1, 2008

(54) RANDOM ACCESS MEMORY BASED SPACE TIME SWITCH ARCHITECTURE

(75) Inventor: Patrick W Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1244 days.

(21) Appl. No.: 10/210,756

(22) Filed: Jul. 31, 2002

(65) Prior Publication Data

US 2004/0022239 A1   Feb. 5, 2004

(51) Int. Cl.
    *H04L 12/50* (2006.01)
(52) U.S. Cl. .................... 370/369; 370/395.7; 370/429
(58) Field of Classification Search ...................... None
    See application file for complete search history.

(56) References Cited

U.S. PATENT DOCUMENTS

| | | | |
|---|---|---|---|
| 5,473,566 A * | 12/1995 | Rao | 365/189.12 |
| 5,717,693 A | 2/1998 | Baydar et al. | |
| 5,917,427 A | 6/1999 | Peres et al. | |
| 5,923,653 A | 7/1999 | Denton | |
| 6,108,333 A | 8/2000 | Raamot et al. | |
| 6,157,639 A | 12/2000 | Lindberg et al. | |
| 6,188,685 B1 | 2/2001 | Wolf et al. | |
| 6,205,158 B1 | 3/2001 | Martin et al. | |
| 6,208,648 B1 | 3/2001 | Scheer et al. | |
| 6,301,228 B1 | 10/2001 | Bordogna et al. | |
| 6,330,237 B1 | 12/2001 | Suda et al. | |
| 6,366,579 B1 | 4/2002 | Lindberg | |
| 6,377,586 B1 | 4/2002 | Seo et al. | |
| 2001/0017859 A1 | 8/2001 | Laubner et al. | |
| 2001/0033569 A1 | 10/2001 | Dally | |
| 2001/0033584 A1 | 10/2001 | Dally | |
| 2001/0038613 A1 * | 11/2001 | Gray | 370/258 |
| 2001/0053160 A1 | 12/2001 | Dally | |
| 2002/0001305 A1 | 1/2002 | Hughes et al. | |
| 2002/0005128 A1 | 1/2002 | Yehuda et al. | |
| 2002/0018475 A1 | 2/2002 | Ofek et al. | |
| 2002/0064170 A1 | 5/2002 | Siu et al. | |
| 2003/0112831 A1 * | 6/2003 | Williams | 370/535 |

* cited by examiner

*Primary Examiner*—Jay K. Patel
*Assistant Examiner*—Jung Park
(74) *Attorney, Agent, or Firm*—Alan K. Stewart; W. James Brady; Frederick J. Telecky, Jr.

(57) ABSTRACT

A data switching circuit (10). The data switching circuit comprises at least one input ($10_{in}$) for receiving during a same time period a plurality of data streams (ICH0-ICH127). Each of the data streams comprises a plurality of like-sized data quantities. The data switching circuit further comprises a plurality of addressable memories ($10_x$), wherein each of the plurality of addressable memories comprises a plurality of memory cells. The data switching circuit further comprises circuitry (11) for writing into each of the plurality of addressable memories a copy of a same set of data quantities provided by the data streams during a first period of time. Lastly, the data switching circuit further comprises reading circuitry (13, 14), coupled to each respective one of the plurality of addressable memories, for reading during a second period of time a number of data quantities from the respective addressable memory and outputting the read data quantities to output channels.

19 Claims, 5 Drawing Sheets

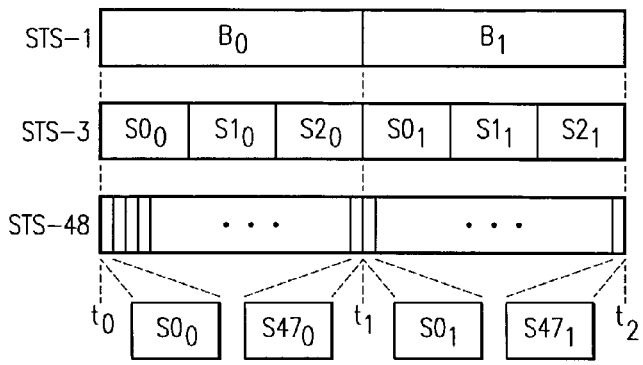
FIG. 1
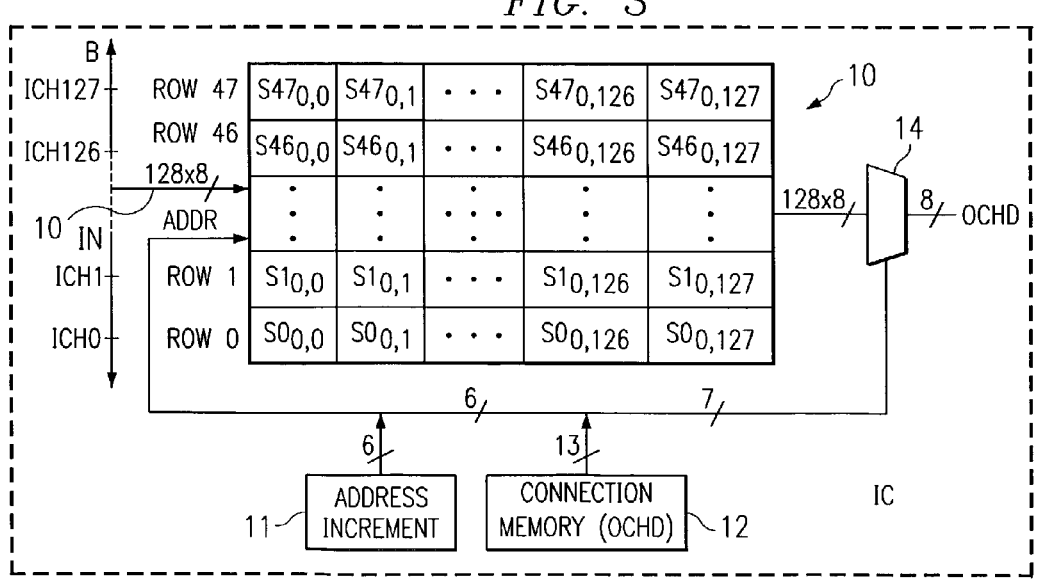

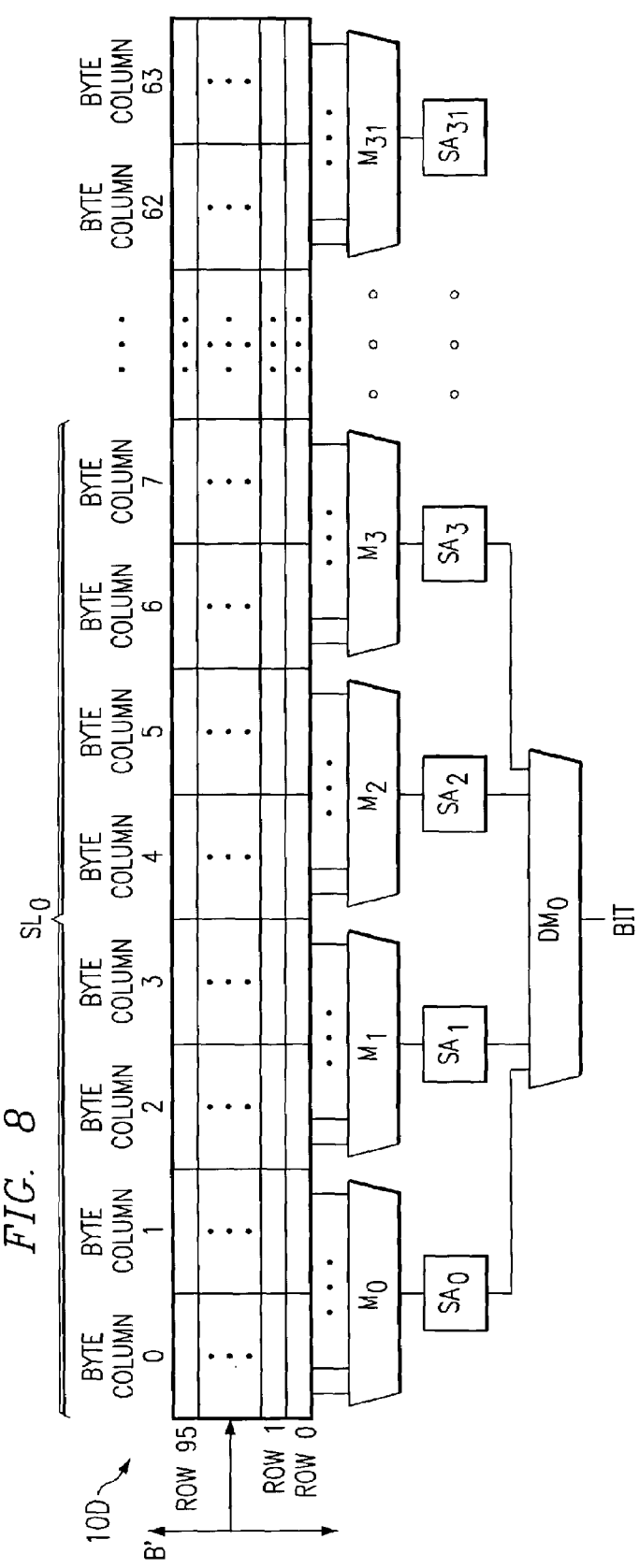

RANDOM ACCESS MEMORY BASED SPACE TIME SWITCH ARCHITECTURE

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to electronic switching structures and more particularly to a random access memory switching structure for rapidly switching data from multiple input channels, each carrying interleaved data streams, to any one of a set of multiple output channels. Such data streams may be provided in various forms, where by ways of example such data are often provided in optical transmission systems. For example, optical systems are standardized such as in the synchronous optical networks ("SONET") standard and the Synchronous Digital Hierarchy ("SDH") standard, and these standards define various data formats, such of which are used as examples blow. In any event, such optical transmission systems may be improved by the preferred embodiments, as detailed below.

The present embodiments relate to switching of high-speed and relatively large data quantities, as are now explored by way of example in connection with FIG. 1. Specifically, FIG. 1 illustrates a stream of data in a known STS-1 format, where such a format is defined by the standard and used in SONET systems, and a comparable version also may be used in SDH systems. The STS-1 format transmits a serial stream of 8-bit bytes, and in the example of FIG. 1 two such bytes $B_0$ and $B_1$ are shown, where byte $B_0$ spans a byte interval from $t_0$ to $t_1$ and byte $B_1$ spans a byte interval from $t_1$ to $t_2$. Under the STS-1 standard, the data rate is defined at 51.84 Mbits/second and, thus, each byte such as byte $B_0$ and byte $B_1$ is transmitted at a byte rate of 6.48 MHz (i.e., 6.48 MHz×8 bits/second=51.84 Mbits/second).

To achieve greater data throughput as compared to STS-1, data is interleaved to implement other STS values, typically designated STS-x where x indicates the level of interleaving. In this regard, FIG. 1 also illustrates a stream of data in a known STS-3 format. Here, the value of x=3 indicates that three streams of data are interleaved into a single STS-1 byte interval, as also shown in FIG. 1. Thus, during the STS-1 byte interval from $t_0$ to $t_1$, three bytes from three different streams are shown as $S0_0$, $S1_0$ and $S2_0$, where the subscript "0" indicates a byte number for a corresponding stream number S0, S1, or S2. Thus, during the single STS-1 byte interval there are three STS-3 byte intervals corresponding to the bytes $S0_0$, $S1_0$ and $S2_0$, respectively. Similarly, during the STS-1 byte interval from $t_1$ to $t_2$, again three bytes from the three different streams are shown as $S0_1$, $S1_1$, and $S2_1$. Given this data format, one skilled in the art will readily confirm that the STS-3 format permits a data rate of three times that of STS-1, that is, equal to 3×51.84=155.52 Mbits/second.

Completing the illustration and discussion of FIG. 1, it further demonstrates yet another STS-x data format, namely, a stream of STS-48 data. From the preceding conventions and discussion, one skilled in the art will readily appreciate that the STS-48 data includes, for one STS-1 byte interval, 48 bytes of interleaved data from 48 different serial streams. Thus, by way of example, in the STS-1 byte interval from $t_0$ to $t_1$, FIG. 1 also illustrates a first byte from a first stream $S0_0$, followed by 47 additional bytes during that byte interval, each from a respective one of 47 additional streams, thereby concluding with the forty-eighth byte $S47_0$ as provided by a forty-eighth data stream. Thus, during the single STS-1 byte interval there are 48 STS-48 byte intervals corresponding to the bytes $S0_0$ through $S47_0$, respectively. Accordingly, the STS-48 format permits a data rate of 48 times that of STS-1, that is, equal to 48×51.84=2,488.32 Mbits/second, or a byte rate of 311.04 MHz.

Various architectures now use the STS-x formats for communicating data and, thus, various circuit designs have been developed for such systems. In this regard, one need in such systems is for switching circuits where STS-x inputs are provided and STS-x outputs are needed. Further, in addition to the use of interleaving STS-x streams to achieve higher data rates, another aspect sometimes related to such streams is the input of multiple channels of such streams, meaning each such channel provides the same STS-x format. For example, recall above that the STS-48 standard provides 48 bytes during a single STS-1 byte interval, and systems are now requiring the capacity to deal with multiple channels of such bytes. For example, one contemporary approach, and indeed as used by way of example in connection with the preferred embodiments described later, provides 128 channels. Accordingly, during a single STS-1 byte interval (i.e., 1/6.48 MHz), such a system receives 128 channels, each with a stream of 48 bytes, for a total of 128×48=6,144 bytes; in other words, each channel provides its own stream of data at a same time that the other 127 channels are providing their respective streams of data. In response, these systems are required to receive these inputs over an STS-1 byte interval and then during one STS-1 byte interval to select any input byte from any input channel and provide it to any STS-48 byte interval, within a common STS-1 byte interval, of any output channel. For example, in a particular STS-1 byte interval, a byte in STS-48 byte interval 0 from input channel 2 might be switched to STS-48 byte interval 17 of output channel 49, while also during that same particular STS-1 byte interval a byte in STS-48 byte interval 5 from input channel 12 might be switched to STS-48 byte interval 32 of output channel 105; further, also during this same particular STS-1 byte interval, there must be full flexibility in the destination of all other separates bytes during that interval, that is, from each separate byte stream of each separate input channel to be output to any STS-48 byte interval of any output channel. Typically it is also permitted to broadcast a single input byte to multiple STS-48 byte intervals of a single output channel or multiple output channels with the same, different, or multiple STS-48 byte intervals.

Systems for switching bytes in the manner introduced above with respect to FIG. 1 are sometimes referred to as space-time switching or time-spaced interleaved switching ("TSI"). The term "time" is used to suggest that a byte in one time period may be switched to a different time period, while the term "space" is used to suggest that a byte from one channel (or stream) may be switched to a different channel. Moreover, the integrated circuit devices implementing this function are sometimes referred to as switch-fabric chips and often use complex stages, where one or more stages will switch data bytes with respect to time while one or more other stages will such data bytes with respect to space. These approaches are often limited in speed or data capability, and they may require complex considerations relative to timing when multiple stages are involved. As another approach, multi-port memories have been used for data switching, but by definition such an approach requires multiple ports per memory storage cell. As a result, the area required to form the circuit increases as approximately the square of the number of ports. Consequently, as the amount of data to be shifted has increased with technology, the area required from a multiple port approach has become increasingly inefficient if not prohibitively expensive.

In view of the above, there arises a need to address the complexities and drawbacks of the prior art and the requirements for such switching systems, as is achieved by the preferred embodiments discussed below.

BRIEF SUMMARY OF THE INVENTION

In a preferred embodiment, there is a data switching circuit. The data switching circuit comprises at least one input for receiving during a same time period a plurality of data streams. Each of the data streams comprises a plurality of like-sized data quantities. The data switching circuit further comprises a plurality of addressable memories, wherein each of the plurality of addressable memories comprises a plurality of memory cells. The data switching circuit further comprises circuitry for writing into each of the plurality of addressable memories a copy of a same set of data quantities provided by the data streams during a first period of time. Lastly, the data switching circuit further comprises reading circuitry, coupled to each respective one of the plurality of addressable memories, for reading during a second period of time a number of data quantities from the respective addressable memory and outputting the read data quantities to output channels.

Numerous further aspects are provided with respect to various of the data switching elements. Thus, these other aspects are also disclosed and claimed.

BRIEF DESCRIPTION OF THE SEVERAL VIEWS OF THE DRAWING

FIG. 1 illustrates a stream of data in a known STS-1 format.

FIG. 2 illustrates the time sequence of data for a single STS-1 byte interval for each of 128 input channels.

FIG. 3 illustrates a diagram of the contents of a first RAM designated generally at 10 and for storing data from 128 input channels, each of which provides one byte of data from 48 different streams.

FIG. 7 illustrates an alternative RAM 10C that may be used in combination with any of the preceding embodiments to create an additional alternative system embodiment, where RAM 10C can be written at twice (or some other multiple) the speed of the RAM in FIG. 4 and, thus, RAM 10C include twice (or some other multiple) the number of rows and half (or some other fraction less than one) the number of columns of the RAM in FIG. 4.

FIG. 8 illustrates an alternative RAM 10D that may be used in combination with any of the preceding embodiments, where RAM 10D includes a different data orientation and the grouping of multiple (e.g., 16) RAM columns into a respective internal multiplexer prior to sense amplification.

DETAILED DESCRIPTION OF THE INVENTION

Figure 4:
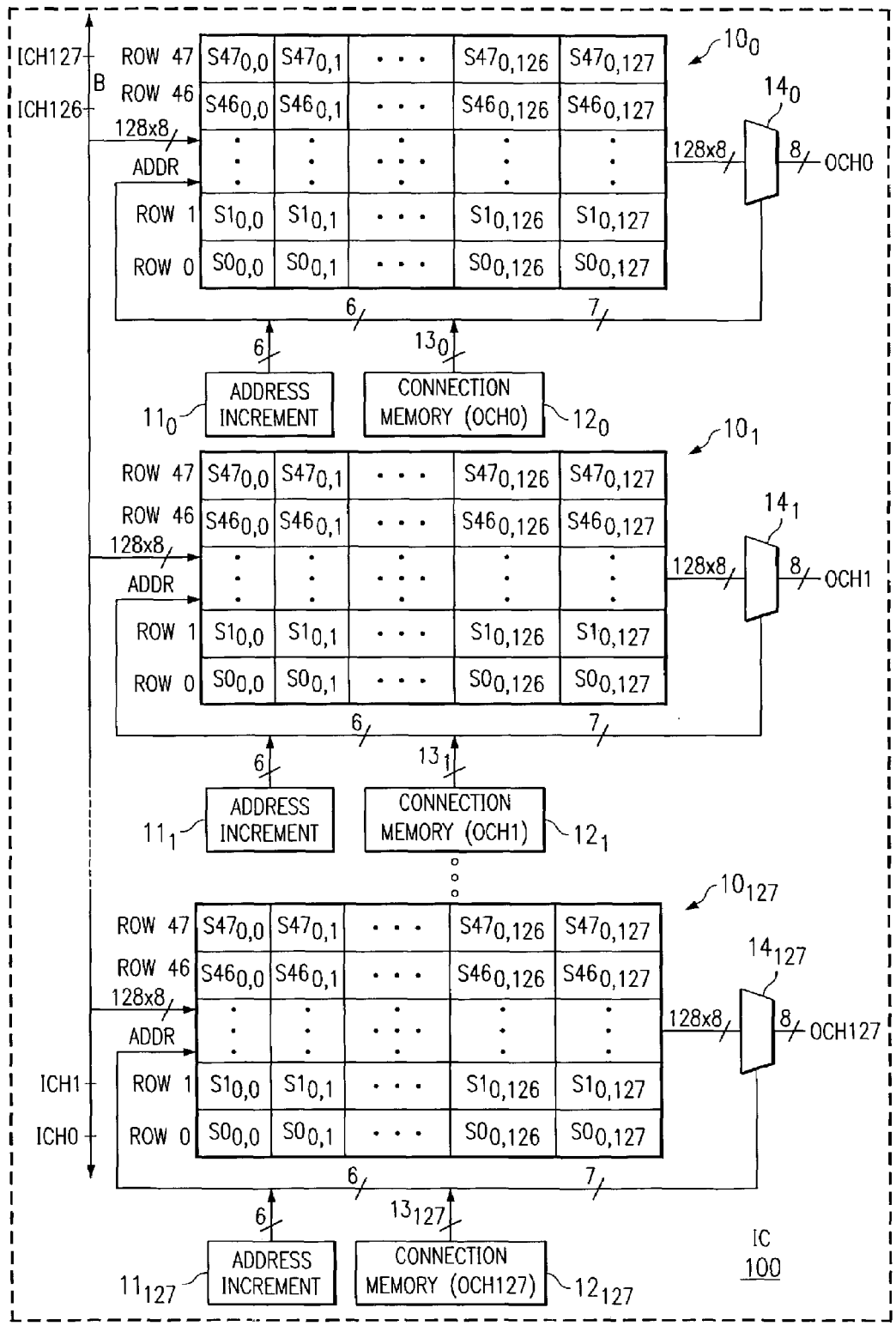
FIG. 4 illustrates a switching system 100 in accordance with one preferred embodiment, and which replicates RAM 10 and its related structure from FIG. 3 a total of 128 times.

FIG. 1 was described above in the Background Of The Invention section of this document and the reader is assumed to be familiar with the principles of that discussion.

The preferred embodiments receive a number of input channels, each providing a number of STS-x data streams, and are operable to switch each byte of that data to one of various time periods directed to one of various output channels. As introduced earlier, an example of the preferred embodiments is illustrated with respect to STS-48 data, and also in connection with the example embodiment the number of input and output channels are both equal to 128. To further facilitate a discussion of this example, FIG. 2 illustrates the time sequence of data for a single STS-1 byte interval for each of the 128 input channels. For example, looking to the top row of the data shown in FIG. 2, it illustrates the 48 bytes arriving sequentially from respective streams of data arriving from input channel 0, where each byte is shown as $SA_{b,c}$, where: (i) A is the stream number ranging from 0 through 47; (ii) b is the byte number within a stream and which for the single input STS-1 byte interval is the same for all streams and for sake of example is equal to "0;" and (iii) c is the input channel number and therefore in the first row of FIG. 2 is also equal to "0." Accordingly, the top row includes bytes $S0_{0,0}$ through $S47_{0,0}$. Looking then to the second row from the top in FIG. 2, it illustrates the 48 bytes from respective streams S0 through S47 arriving from input channel 1, at the same time that 48 bytes are also received along input channels 0 and 2 through 127. These conventions are used hereafter and, thus, the bottom row of FIG. 2 illustrates the 48 bytes from respective streams S0 through S47 arriving from input channel 127. Thus, when the STS-1 byte interval illustrated is complete, a total of 48×128=6,144 bytes are provided. For sake of reference in the remainder of this document, the STS-48 byte interval where each byte is located is referred to as the time slot corresponding to that byte. The goal of the preferred embodiment is to switch any of these 6,144 bytes from any of their time slots to any different time slot in a single output STS-1 byte interval and to any one of 128 output channels. In other words, if FIG. 2 is considered a first grouping of 6,144 bytes spanning one input STS-1 byte interval, then the goal of the preferred embodiments is to be able to select up to each and every byte from the first grouping and switch it to a second grouping during a single output STS-1 byte interval, that is, to switch each such byte from any time slot in the first grouping (i.e., of any given input channel and time within the input STS-1 byte interval) to any time slot in the second grouping (i.e., of any given output channel and time within a common output STS-1 byte interval).

In the preferred embodiments, the above-stated goal of switching data bytes from input time slots in an input STS-1 byte interval to any time slot in a single output STS-1 byte interval is achieved, in part, by storing copies of the first grouping in multiple random access memories ("RAM") and then addressing the memories in a manner to select time slots to output to the desired output channels during the output STS-1 byte interval. To introduce this aspect, FIG. 3 illustrates a diagram of the contents of a first RAM designated generally at 10 and which is preferably formed on an integrated circuit IC along with other supporting circuitry as detailed later. In the preferred embodiment, RAM 10 includes a number of storage cells, where each cell is a single-port cell so as to minimize the size of the overall RAM, although some of the present inventive aspects also have beneficial application when combined with multiple-port memory cells. Additionally, RAM 10 preferably is sized to include a number of rows equal to the number of input streams per channel and, thus, in the present example there are 48 rows indicated as ROW 0 through ROW 47. Each row is for storing the 128 data bytes, each from a respective one of the streams SA of data bytes as those bytes arrived during a single STS-48 byte interval along input channels 0 through 127. Preferably, the bytes are written in a single write operation to an input $10_{in}$ of RAM 10 from a 128 byte (i.e., 128 bytes×8 bits=1,024 bits) bus B that receives those 128 bytes in parallel from the 128 input channels shown as ICH0 through ICH127. By way of example, bus B is shown internal to integrated circuit IC, and note also that the included illustration in intended to demonstrate that system 10 is preferably used in connection with a system, such as an optic transmission system, wherein a bus such as bus B receives data bytes from numerous channels, where each channel includes serials byte streams such as STS-x data at an off-chip data rate (e.g., byte rate of 311.04 MHz). For example, in an optic transmission system, a serial bit stream of approximately 2.5 Gbps may be input as a single channel to a serial link receiver. The receiver detects the stream and also converts it to byte-width data, thereby outputting a single byte-wide channel at the 311.04 MHz example provided above. Accordingly, such a receiver or receivers may output 128 of these byte-wide channels, thereby providing the bytes of the illustrated example. Looking further to that specific example, along ROW 0 are shown the 128 data bytes $S0_{0,0}$ through $S0_{0,127}$, where these bytes are shown from FIG. 2 to be provided at a single byte interval along parallel input channels 0 through 127. Thus, looking to both FIGS. 2 and 3, according to the preferred embodiments, during a single STS-48 byte interval as shown by the first column in FIG. 2, 128 bytes are received; in response, during a single STS-48 byte interval, those 128 bytes are provided to bus B, concatenated, and written into the bottom row of RAM 10 as shown in FIG. 3. Accordingly, such operations preferably implement a clock frequency for STS-48 data of the STS-1 rate of 6.48 MHz times 48 since there are 48 bytes arriving during the STS-1 byte interval, thereby providing a rate of 6.48 MHz×48=311.04 MHz. Note that the signals may be input to the integrated circuit that includes RAM 10 in a different format, such as on higher speed single-bit-wide streams, but they are preferably converted on chip to 8-bit wide streams at 311.04 MHz for purposes of input to RAM 10. This process continues, with each indicated column of FIG. 2 being written into each corresponding row of RAM 10 in FIG. 3. In other words, RAM 10 is incrementally addressed by incrementing address circuitry 11, and each incremented address (i.e., row) is written with each column of bytes in FIG. 2. As a result, at the conclusion of 48 of the STS-48 byte intervals (i.e., one STS-1 byte interval), the contents of RAM 10 include the entire 6,144 bytes of FIG. 2.

FIG. 3 further illustrates a connection memory 12 connected to provide an address in part to RAM 10 and in part to a multiplexer 14 connected to receive the output of RAM 10 at the multiplexer data input, where such devices are provided for providing a read of RAM 10 after it has been written with 6,144 bytes as described above. Thus, after 48 clock cycles, RAM 10 has a full STS-1 byte interval worth of data in it, and in the preferred embodiment for the next 48 clock cycles RAM 10 is switched from write to read in connection with the read circuitry as is now described. Specifically, connection memory 12 stores a desired connection pattern, that is, the addresses of 48 bytes to be read out to a single desired output channel OCHD of the 128 output channels. In the preferred embodiment, the addresses stored in connection memory consist of 13 bits. Six of the 13 address bits from connection memory 12 are used to address any one of the 48 rows of RAM 10 and, in response, RAM 10 outputs an entire row (i.e., 128 bytes) to the data input of multiplexer 14. The remaining seven of the 13 address bits from connection memory 12 are used to control multiplexer 14 so that it will in response select any one of the 128 bytes provided to it from RAM 10 and thereby output the selected byte to the single output channel OCHD. Using this operation, therefore, in the course of 48 successive clock cycles, for each clock cycle an address from connection memory 12 can select any byte in RAM 10 and output that byte to the single desired output channel OCHD.

FIG. 4 illustrates a switching system 100 in accordance with one preferred embodiment, and which replicates RAM 10 and its related structure from FIG. 3 a total of 128 times, where system 100 is also preferably formed on a single integrated circuit IC. To designate the copied structures, a subscript from 0 to 127 is added to each structure from FIG. 3 that is comparable and that also is replicated 128 times. For example, again the bus B receives the 128 input bytes from input channels ICH0 through ICH127, and in FIG. 4 bus B is connected to provide those bytes, as a concatenated 128 byte word, to each of 128 RAMs $10_0$ through $10_{127}$. Further, each RAM $10_x$ through $10_{127}$ is written by incrementing its word (i.e., row) address and writing a next set of 128 bytes to the addressed row, repeating the process for a total of 48 writes. Thus, at the end of the 48 writes, each RAM $10_x$ through $10_{127}$ stores an exact copy of the data in each of the other RAMs. Next, each RAM $10_x$ through $10_{127}$ is read with respect to its corresponding output channel. Looking then to $RAM10_0$ by way of example, it receives a read address from a connection memory $12_0$, where connection memory $12_0$ stores the desired connection pattern for output channel OCH0, that is, the connection pattern specifies the 48 bytes to be read out to output channel OCH0 over a course of 48 STS-48 clock cycles. At the same time, however, each other RAM $10_x$ has a corresponding connection memory $12_x$ with a connection pattern for the corresponding output channel OCHx. Accordingly, during the same 48 clock cycles that RAM $10_0$ is read to provide 48 bytes to output channel $OCH_0$, then RAM $10_1$ is read to provide 48 bytes to output channel $OCH_1$, RAM $10_2$ is read to provide 48 bytes to output channel $OCH_2$, and so forth through RAM $10_{127}$ being read to provide 48 bytes to output channel $OCH_{127}$. Accordingly, the capacity of switching system 100 in its entirety is such that over 48 STS-48 clock cycles (i.e., one STS-1 byte interval), it may switch a total of 48×128=6,144 bytes from input channels ICH0 through ICH127 to any of output channels OCH0 through OCH127.

Figure 5:
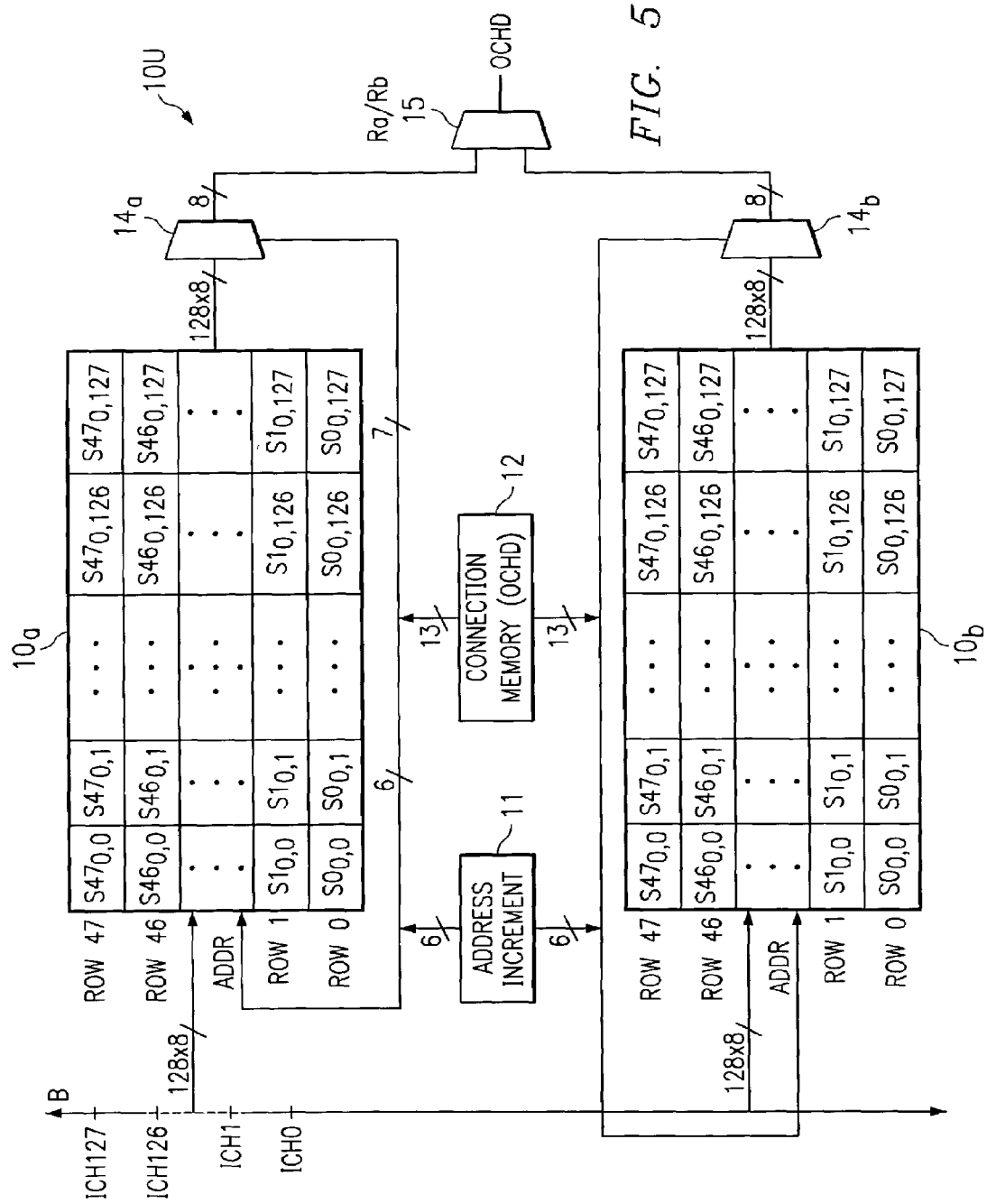
FIG. 5 illustrates a unit 10U according to another embodiment that implements a ping pong RAM structure and that may be used in lieu of various other RAM detailed herein.

FIG. 5 illustrates a unit 10U according to another embodiment and that may be used preferably in lieu of RAM 10 in FIG. 3 as well as for each of RAM $10_x$ through $10_{127}$ of FIG. 4 and still additional RAMs of additional embodiments described below. By way of introduction, unit 10U includes dual RAMs 10a and 10b and in operation one of these RAMs is read while the other is written and vice versa, for a "ping pong" effect. In this manner and as explained below, continuous data throughput is provided. Both RAM 10a and 10b are connected to receive data from bus B, where again for each 311.04 MHz clock cycle (i.e., STS-48 time interval) bus B provides 128 concatenated bytes from 128 different input channels. Additionally, both RAM 10a and 10b are connected to incrementing address circuitry 11 for incrementing the row address of both RAMs during the writing of those RAMs. For purposes of reads, each RAM 10a and 10b is addressed by a connection memory 12, where memory 12 stores a desired connection pattern for both RAMs; in addition, that pattern also provides an address to multiplexers 14a and 14b, each of which is connected to a respective data output from RAM 10a and 10b. The output of both multiplexer 14a and 14b is connected as a data input to a multiplexer 15, which is controlled by a control signal Ra/Rb and which provides at its output the data for an output channel OCHD.

The operation of unit 10U is in many respects the same as that described for RAM 10 above, with the addition of the ping pong nature introduced above. Specifically, at the STS-48 clock frequency of 311.04 MHz, data is provided to bus B but during a first STS-1 byte interval (i.e., 48 STS-48 clock periods) and only one of the two RAMs 10a and 10b is written while the other is read. By way of example, therefore, the signals Ra and Rb are complementary and are enabled during a read of RAM 10a and 10b, respectively. For example, assume for a first set of 48 STS-48 clock periods that Ra is enabled so that RAM 10a is read, while at the same time Rb is disabled so that RAM 10b is written. Thus, in these states and for the first set of 48 STS-48 clock periods, bus B provides words of 128 concatenated bytes to RAM 10b, as facilitated by the increment of the RAM 10b address as provided during each STS-48 clock cycle by incrementing circuitry 11. During this same first set of 48 STS-48 clock periods, however, RAM 10a is read in the same manner described above with respect to RAM 10. Thus, for each such cycle, connection memory 12 provides a 13-bit address, 6 bits of which address a row to be output from RAM 10a and 7 bits of which cause multiplexer 14a to output a selected byte from that row to the input of multiplexer 15. Further, the asserted value of Ra causes that selected byte to be output to the desired output channel OCHD. After the first set of 48 STS-48 clock periods are complete, therefore, 48 rows have been read from RAM 10a and a byte has been selected from each such row, while at the same time 48 rows have been written to RAM 10b.

Continuing with the operation of unit 10U, immediately following the first set of 48 STS-48 clock periods is a second set of 48 STS-48 clock periods, and during that second set of clock periods the states of Ra and Rb are reversed as compared to their states in the first set of clock periods. Accordingly, during this second set of clock periods, RAM 10a is written while RAM 10b is read, both of which occur in the same manner as described above for the first set of clock periods but in reverse relationship relative to RAMs 10a and 10b. Briefly, therefore, RAM 10a is written by incrementing its address for each write while RAM 10b is read by providing an address from connection memory 12 to it, and the read word is output to multiplexer 14b from which one byte is provided to multiplexer 15 which in turn outputs that byte to output channel OCHD. Given the preceding, one skilled in the art will appreciate that due to the use of two RAMs 10a and 10b, the read operation can continue in an uninterrupted fashion, that is, there is no stoppage for 48 STS-48 clock periods in order to wait for the RAM to first be written. Similarly, the write operation can continue in an uninterrupted fashion, that is, there is no stoppage for 48 STS-48 clock periods in order to wait for previous data in the RAM to first be read.

Figure 6:
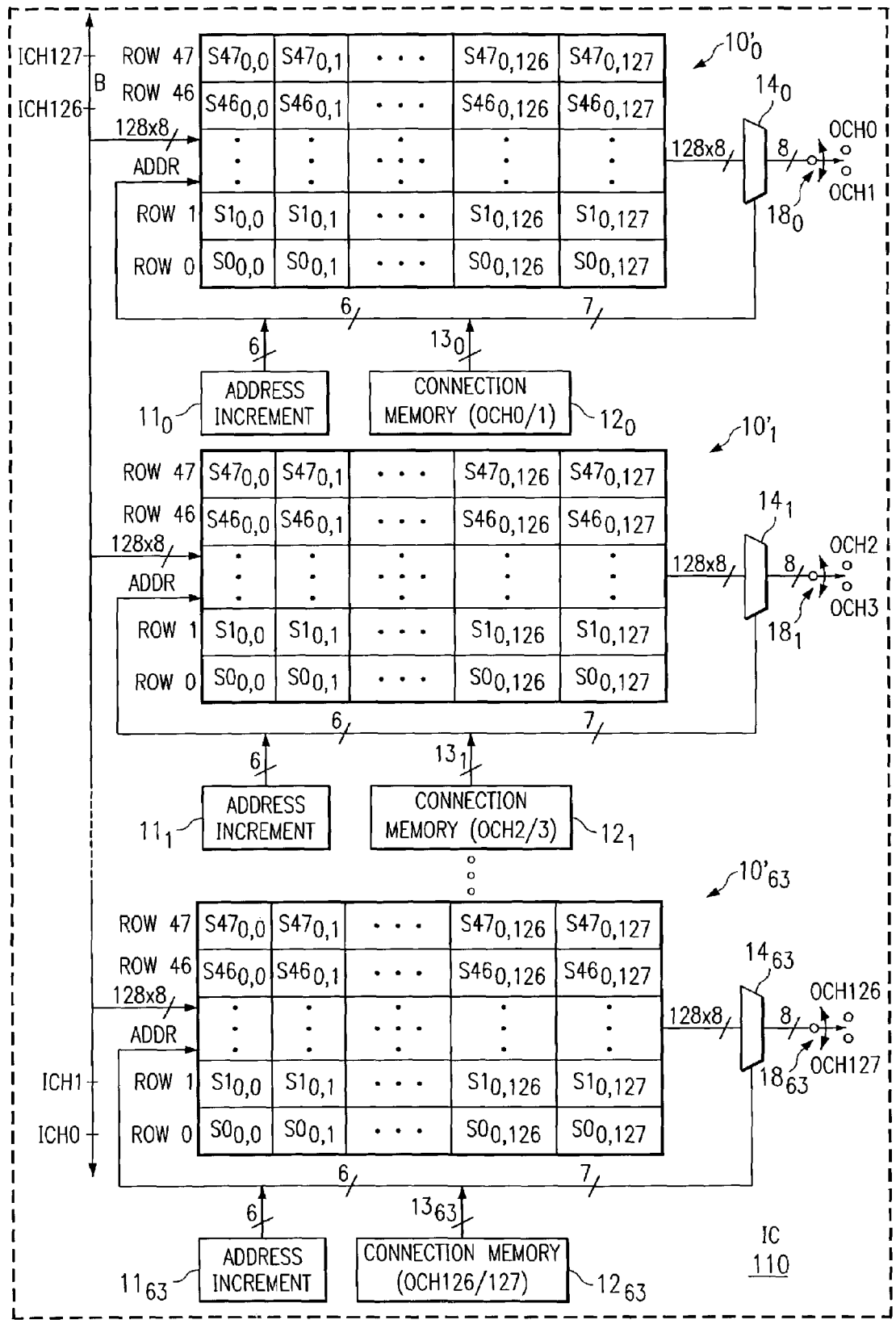
FIG. 6 illustrates a switching system 110 in accordance with another preferred embodiment, where its RAMs may be read at twice (or some other multiple) the speed of the RAM in FIG. 4, thereby permitting each RAM to support twice (or some other multiple) the number of output channels as compared to FIG. 4.

FIG. 6 illustrates a switching system 110 in accordance with another preferred embodiment, where again RAM 10 and comparable related structure from FIGS. 3 and 4 are replicated or where unit 10U and its structure could be replicated, with the following exceptions. System 110 is preferably formed on an integrated circuit IC. Additionally, in system 110, each RAM $10'_x$ is the same size as RAM 10 in FIG. 3; however, the read speed of each RAM $10'_x$ is doubled as compared to the RAM $10_x$ in system 100 of FIG. 4. In other words, recall above that each RAM $10_x$ is read at a rate of 48 bytes per STS-1 interval and, thus, each such RAM is read at 311.04 MHz. In contrast, in system 110, each RAM $10'_x$ is constructed in a manner, as is readily ascertainable by one skilled in the art, to be read at twice that rate, that is, at 2×311.04=622.08 MHz. As explained below, because each RAM $10'_x$ in system 110 can be read at a relatively doubled speed, it can provide data to two output channels as opposed to one. Additionally and as explained below, because two such channels are supported by each RAM $10'_x$, then an alteration is also made for providing the connection patterns to address each RAM $10'_x$.

Looking further to the structure of FIG. 6, there are a total of 64 double-speed RAMs designated RAM $10'_0$ through $10'_{63}$, and each RAM has a like kind of comparable structure connected to it. Looking then to RAM $10'_0$ by way of example, a connection memory $16_0$ is connected to provide an address in part to RAM $10'_0$ and in part to a multiplexer $14_0'$ connected to receive the output of RAM $10'_0$ at the multiplexer data input, where such devices are provided for providing a read of RAM $10'_0$ after it has been written with 6,144 bytes in the same manner as described above with respect to RAM 10 of FIG. 3. However, note that the output of multiplexer $14_0'$ is connected to a switch $18_0$, which is provided as a functional equivalent to indicate that the output of multiplexer $14_0'$ may be provided to either output channel OCH0 or to output channel OCH1. Further in this regard, connection memory $16_0$ carries a different reference number as used with respect to system 100 of FIG. 4, because the former now stores the connection patterns for both output channel OCH0 and output channel OCH1. Alternatively, two separate connection memories, such as shown as $12_0$ and $12_1$ in FIG. 4, could be multiplexed to achieve the same result, that is, to provide connection patterns for both output channels OCH0 and OCH1. Alternatively, one connection memory with twice the number of output bits may be used.

The operation of system 110 is as follows. First, for each of 48 clock cycles forming a write period, bus B provides concatenated data bytes from each of the 128 input channels as described above, and each of these concatenated words are written into a same row of each of RAMs $10'_0$ through $10'_{63}$. Thus, after this write period of 48 clock cycles, each of RAMs $10'_0$ through $10'_{63}$ stores a full STS-1 byte interval worth of data in it. Second, for each of the next 48 clock cycles forming a read period, each of RAMs $10'_0$ through $10'_{63}$ is read twice; in other words, recall that these RAMs are formed to be readable at twice the byte interval rate for the incoming data standards (e.g., STS-48). For a first of these two reads, the corresponding connection memory $16_x$ provides an address for a first output channel, and for a second of these two reads, the corresponding connection memory $16_x$ provides an address for a second output channel. Given the RAM size is the same as above, again the address is preferably 13 bits, six bits of which address any one of the 48 rows of the corresponding RAM $10'_x$ and the remaining seven bits of which are used to control the corresponding multiplexer $14'_x$.

By way of example of the above and looking to RAM $10'_0$, during a single STS-48 clock cycle, it is read twice. In the first read, connection memory $16_0$ provides an address of data to be provided to output channel OCH0, and that address causes the data to be output to multiplexer $14'_0$ and then output to switch $18_0$, which in turn directs the data to output channel OCH0. In the second read, connection memory $16'_0$ provides an address of data to be provided to output channel OCH1, and that address causes the data to be output to multiplexer $14'_0$ and then output to switch $18_0$, which in turn directs the data to output channel OCH1. Using this operation, therefore, in the course of 48 successive clock cycles, for each clock cycle two addresses from connection memory 12 can select any two bytes in RAM $10'_0$ and output those bytes to the pair of output channels OCH0 and OCH1, respectively. Given the preceding operation of system 110, at the end of the 48 successive clock cycles, 48 STS-48 bytes have been output to each of output channels OCH0 and OCH1. In the same manner, each additional RAM $10'_1$ through $10'_{63}$ also provides a total of 48 STS-48 bytes to a pair of output channels. Thus, system 110 of FIG. 6 provides the same effective throughput and overall data rate as system 100 of FIG. 4, that is, a total of 6,144 bytes can be output to 128 channels in one STS-1 byte interval. In addition, however, system 110 achieves its throughput using only half the number of RAMs (and multiplexers) as compared to system 100. As a result, system 110 requires considerably less integrated circuit chip area as compared to system 100 and, thus, such an approach is likely to be preferred in most circumstances, such as to reduce cost, complexity, and still other considerations known in the art.

Also contemplated for still another embodiment is further extending the approach of system 110 to even fewer number of RAMs. For example, if each RAM $10_x'$ can be read at three times the 311.04 MHz SLS-1 byte rate, the number of RAMs $10_x'$ can be further reduced to the integer, rounding upward, from 128/3, that is, equal to 43 RAMs, where all but one of the RAMs provides outputs to 3 output channels (and the remaining one provides outputs to 2 output channels). As another example, if each $RAM10_x$ can be read at four times the 311.04 MHz SLS-1 byte rate, the number of RAMs $10_x'$ can be further reduced to 128/4=32 RAMs, where each of the RAMs provide outputs to four output channels. Thus, one skilled in the art will appreciate that to the extent the RAM read frequency can exceed the STS-48 data clock frequency (e.g., 311.04 MHz), the number of RAMs can be decreased accordingly.

Two additional observations are also noteworthy with respect to system 110. First, while system 110 illustrates one RAM $10'_x$ per pair of output channels, in a preferred embodiment the unit 10U from FIG. 6 is used for each illustrated RAM $10'_x$, that is, each such RAM actually includes a pair of RAMs to operate in a ping pong fashion as described above. Second, while the preferred embodiment of system 110 increases (e.g., doubles) the RAM write speed relative to the 311.04 MHz STS-1 data byte rate provided by bus B, there may be reasons to not apply such an increased speed to output circuitry related to the RAM. For example with respect to RAM $10'_0$, rather than a single corresponding output multiplexer 140 that is also clocked at twice (or another multiple of) the 311.04 MHz STS1 data byte rate, an alternative would be to connect the output of RAM $10'_0$ to two separate multiplexers, each of which is clocked at the same 311.04 MHz STS-1 data byte rate. Indeed, there may be limits of ASIC flow and design tools that render it more convenient to clock peripheral circuitry in this manner, so while the RAM remains clocked at a multiple of the base data rate other output circuitry may be duplicated so that each copy can be clocked at the base data rate.

FIG. 7 illustrates an alternative RAM 10C that may be used in combination with any of the preceding embodiments to create additional alternative system embodiments by replacing the RAMs therein with RAM 10C. By way of introduction, recall in the preceding embodiments the STS-48 byte write speed to each RAM 10 (or a variation of that RAM) is 311.04 MHz. For example, recall with reference to FIG. 3 that each row is written with 128 bytes at a speed of 311.04 MHz, thereby filling 48 rows at the end of 48 clock cycles, each cycle having a period of 1/311.04 MHz. In contrast with respect to RAM 10C in FIG. 7, it is constructed in a manner ascertainable by one skilled in the art so that it can be written at twice the STS-48 clock speed of 311.04 MHz, that is, so that it may be written at 2×311.04 MHz=622.08 MHz. Given the doubled write speed capacity of RAM 10C, note also that RAM 10C still requires the storage of 6,144 bytes after 48×311.04 MHz clock cycles. Accordingly, the aspect ratio of RAM 10C is altered so that it has twice the number of rows as compared to RAM 10 of FIG. 3 and half the number of byte columns. Specifically, RAM 10C includes 96 rows designated ROW 0 through ROW 95, and each row is sized to store 64 bytes, thereby giving rise to 64 byte columns 0 through 63. Additionally, RAM 10C includes 64 byte columns 0 through 63. Accordingly, for each clock cycle of 311.04 MHz, and because the write speed is twice the clock cycle rate, then two of the rows of RAM 10C are written. For example, looking to ROW 0, in a first time period equal to one-half of a 311.04 MHz write cycle, ROW 0 is written with bytes $S0_{0,0}$ through $S0_{0,63}$, while in a second time period equal to one-half of a 311.04 MHz write cycle, ROW 1 is written with bytes $S0_{0,64}$ through $S0_{0,127}$. In contrast and looking to RAM 10 in FIG. 3, it is seen that its ROW 0 stores bytes $S0_{0,0}$ through $S0_{0,27}$, that is, RAM 10 stores twice the number of bytes in a row, yet that row of bytes requires twice as long to be written as compared to a single row in RAM 10C.

The approach of RAM 10C can be used in various of the embodiments described herein, and one skilled in the art may find it desirable to do so for various reasons. Notably, compare the aspect ratio of RAM 10 with RAM 10C to appreciate that the latter is more favorable in most instances. Specifically, RAM 10 has 48 rows, each of which includes 1,024 bits (i.e., 128 bytes×8 bits=1,024 bits). Thus, the row/column bit ratio of RAM 10 is 48/1,024. In contrast, RAM 10C has 96 rows, each of which includes 512 bits. Accordingly, the aspect ratio of RAM 10C is much closer to square as compared to that of RAM 10 and, hence, there is an improved reduction in overhead area in constructing RAM 10C as compared to RAM 10. In other words, since RAM 10C is closer to square, the required area to construct it is reduced to an extent that may be considered significant. This also results in a 512 bit output word (requiring one additional RAM read address bit, but one less multiplexer output bit) and reduces the size and cost of the final output multiplexer by about half in that it requires one less multiplexer control bit and therefore less structure than was otherwise required.

Also contemplated for still other embodiments is further extending the approach of RAM 10C to other multiples of the STS-48 clock frequency, thereby necessitating greater write speeds and, correspondingly, a greater number of rows to store each set of data provided in parallel from a set of input channels. Thus, continuing with the described example of 128 input channels, the given RAM may be written at three times the STS-48 frequency, dividing the 128 input bytes into three RAM rows and resulting in a RAM width of 43 bytes and a RAM height of 48*3=144 rows. In such a case, the encoding of the read address is more complex because the number of rows does not divide evenly into the number of input bytes. Further, the encoding of the read address would be the quotient of the 128 bytes divided by the RAM byte width, and the column address would be the remainder. These limitations do not exist in the present example if the RAM can be written at four times the STS-48 frequency, because the 128 bytes then divide evenly into 128/4=32 rows. Concluding this aspect of further increases in speed, yet for certain other examples of even greater RAM-write clock frequencies, the total number of rows in the RAM increases by the same multiple as the increase in the clock frequency (e.g., three times in a previous example), while the number of columns is equal to the next largest integer of the quotient formed by the number of input bytes in a clock cycle (i.e., number of channels) divided by the same multiple as the increase in the clock frequency (e.g., 128/3=42.67 rounded to 43 in the same previous example).

As another consideration with respect to RAM 10C of FIG. 7, while the preferred embodiment increases (e.g., doubles) the RAM write speed relative to the 311.04 MHz STS-1 data byte rate provided by bus B, there may be variations that may be made relative to input circuitry related to RAM 10C in order to write RAM 10C at the multiple of the off-chip rate. For example, while the off-chip STS-1 byte data rate is 311.04 MHz and which provides 1,024 bits in each of those 311.04 MHz cycles, in one alternative embodiment RAM 10C may be written from an internal bus with 512 bits at a rate of 622.08 MHz. As another alternative, RAM 10C may be written from a multiplexer that is connected to select, in each write operation, one-half of the 1,024 bits from bus B so that those selected bits are then written to a row in RAM 10C. Still other alternatives may be provided by one skilled in the art.

FIG. 8 illustrates an alternative RAM 10D that may be used in combination with any of the preceding embodiments to create additional alternative system embodiments by replacing the RAMs therein with RAM 10D. By way of similarity with previous embodiments, recall that RAM 10B includes 512 columns and 96 rows as does RAM 10D of FIG. 7; in its entirety, RAM 10D also stores the 6,144 bytes shown in FIG. 7 as bytes $S0_{0,0}$ through $S47_{0,127}$. However, the 512 columns of RAM 10D do not include sequentially-oriented bytes as was the case illustrated for RAM 10C in FIG. 7. This is because the present inventor notes that while the systems described herein write 512 bits (or 1,024 earlier) at a time to each RAM, the preference is ultimately to output only a single 8-bit byte. Thus, the output dimension is much smaller than the input dimension. In contrast, typically, prior art RAMs have the same write input dimension as their read output dimension, that is, typically the same number of columns are written into such a RAM in a single write operation as are read during a single read operation. As a result of these observations and as detailed below, RAM 10D is constructed so as to reduce its read size relative to its write size, thereby reducing external hardware requirements.

Looking to row 0 of RAM 10D by way of example, again it includes 64 byte columns 0 through 63 and, thus, each row stores a total of 64 bytes of information equaling a total of 512 bits. For RAM 10D, however, the first eight byte columns (i.e., the first 64 bits) store bit 0 for each of the 64 bytes of information to be stored along that row. Using the same convention from above, therefore, the first 64 columns of row 0 store bit 0 of the bytes $S0_{0,0}$ through $S0_{0,63}$. In other words, if RAM 10D were thought of to be formed of eight equal-sized vertical slices, then each slice stores a same bit position for the total of 64 bytes stored along a row; thus, the first such slice $SL_0$ in FIG. 8, which stores bit 0 for each of the 64 bytes $S0_{0,0}$ through $S0_{0,63}$. Similarly, a second such slice (not fully shown in FIG. 8) stores bit 1 for each of the 64 bytes $S0_{0,0}$ through $S0_{0,63}$, and so forth through the eighth such slice $SL_7$ in FIG. 8 stores bit 7 for each of the 64 bytes $S0_{0,0}$ through $S0_{0,63}$. The reasons for storage in this manner are appreciated below.

In another aspect of RAM 10D, its columns are grouped whereby each such group is connected to an input of a corresponding single output multiplexer. In the preferred embodiment, each grouping consists of 16 columns where, as known in the art, such columns are typically provided via a pair of signals with complementary or differential signals (although each pair is shown as a single column in the Figures so as to simplify the illustrations). For example, looking to slice $SL_0$, a grouping of the first 16 of its columns are connected as inputs to a corresponding multiplexer $M_0$, a grouping of the second 16 of its columns are connected as inputs to a corresponding multiplexer $M_1$, a grouping of the third 16 of its columns are connected as inputs to a corresponding multiplexer $M_2$, and a grouping of the fourth 16 of its columns are connected as inputs to a corresponding multiplexer $M_3$. By way of further example, FIG. 8 also illustrates a portion of the eighth and last slice, $SL_7$, which includes four such groupings and where the fourth of those groupings is shown as connected as inputs to a final corresponding multiplexer $M_{31}$. Thus, with respect to the entirety of RAM 10D, a total of 32 multiplexers are provided, each having 16 inputs, thereby collecting the total 512 bit columns from the RAM.

Continuing with the depictions in FIG. 8, each of the 32 multiplexers $M_0$ through $M_{31}$ has its output connected as an input to a corresponding sense amplifier $SA_0$ through $SA_{31}$. Since sense amplifiers typically are defined to be internal within a RAM structure, then it therefore also may be said that each of multiplexers $M_0$ through $M_{31}$ is likewise internal to the RAM structure. As shown in FIG. 8, in the preferred embodiment, the outputs of four sense amplifiers are then grouped as inputs into a single output multiplexer, such as shown by way of example with the outputs of sense amplifiers $SA_0$ through $SA_3$ connected to output multiplexer $OM_0$. This pattern therefore continues for the remaining sense amplifiers, thereby providing a total of eight output multiplexers $OM_0$ through $OM_7$.

The write operation of RAM 10D and its related structure are as follows. Generally, 512 bits are written in a single cycle into a row of RAM 10D, that is, all columns of RAM 10D are written in a single write cycle, and recall that preferably this cycle speed is twice that of the system STS-48 clock cycle. Further, recall from above that the organization of the input bits for RAM 10D along a row are such that bit 0 for all 64 bytes are written in to the first slice $SL_0$ of 64 columns of the RAM 10D row, bit 1 for all 64 bytes are written in to the second slice $SL_1$ of 64 columns of the RAM 10D row, and so forth. Note also in this regard that such an orientation may be achieved simply by re-organizing the physical layout of what is shown earlier as bus B and, thus, in FIG. 8 such a bus is shown as bus B'. In other words, once again 64 inputs bytes are to be input along a single row, rather than concatenating these bytes one after the other, instead bus B' is connected to achieve the above-described organization of all bit position 0 bits followed by all bit position 1 bits and so forth. In the next clock cycle of twice the speed of an STS-48 clock cycle, the row address is incremented and the next 512 bits are written in the same manner, again by grouping like bit positions. This process continues until RAM 10D is fully written with 6,144 bytes of data.

The read operation of RAM 10D and its related structure are as follows. As with previous embodiments, an address of 13 bits for a desired byte is issued to RAM 10D. Seven of the address bits are used to address the desired one of 96 rows, and the columns of that row are then coupled to multiplexers $M_0$ through $M_{32}$, where recall that each of these multiplexers is connected to select one of sixteen inputs. Thus, a same set of four additional address bits are connected to each of the multiplexers $M_0$ through $M_{32}$. In response, each multiplexer selects only one of its 16 inputs; thus, in a single read cycle only 32 columns of RAM 10D are read, one column per one of the multiplexers $M_0$ through $M_{32}$. Consequently, multiplexers $M_0$ through $M_{32}$ in total therefore provide 32 bits to their respective senses amplifiers $SA_0$ through $SA_{31}$. Each sense amplifier $SA_0$ through $SA_{31}$ operates as known in the art, namely, to establish a logic value based on the differential input voltage at its input. For example, in operation, each of multiplexers $M_0$ through $M_{31}$ selects one column (i.e., two differential signals) and outputs it to its corresponding sense amplifier $SA_0$ through $SA_{31}$. In response, the sense amplifier outputs the corresponding digital signal based on the sensed voltage differential. Thus, each set of four sense amplifiers $SA_x$ through $SA_{x+3}$ provides a total of four inputs to a corresponding one of the eight output multiplexers $OM_0$ through $OM_7$. Finally, therefore, a same set of two additional address bits are connected to each of the output multiplexers $OM_0$ through $OM_7$, and each in response outputs a single bit for a total of 8 output bits.

A few additional observations may be made with respect to RAM 10D of FIG. 8. First, while the illustrated example provides a multiplexer factor of 16 (i.e., 16 column inputs to each multiplexer), other embodiments may be created using a different multiplexer factor greater than one. In any event, the use of multiplexers in this manner reduce the number of columns that are read in a given read cycle by corresponding sense amplifiers and also reduce the number of sense amplifiers as well as the corresponding number of bits output by those sense amplifiers. Moreover, a reduction in the number of sense amplifiers allows greater layout pitch for the sense amplifiers, thereby enhancing the efficiency of the circuit layout.

From the above, it may be appreciated that the above embodiments provide numerous alternatives for rapidly switching data from multiple input channels, each carrying interleaved data streams, to any one of a set of multiple output channels. Moreover, various of the above approaches can be combined to optimize design criteria such as complexity and cost. In summary, the approaches may be stated and combined in one example as follows. A space-time switch is provided for STS-x data with $N_{in}$ input channels and $N_{out}$ output channels, where the STS-x data is provided at a system clock frequency of x times 6.48 MHz. Preferably, the switch includes multiple RAMs, where each RAM is written at a speed that is KW times faster than the 6.48x MHz system clock and each RAM is read at a speed that is KR times faster than the 6.48x MHz system clock. The switch then implements x/KR switch units, each producing data outputs for KR data output channels. The $N_{in}$ input channels are combined into a single $N_{in}$ by 8 bit input bus, where the input may be a concatenation of all bits or it may group bits of like bit position. For each switch unit, there are dual (i.e., ping and pong) RAMs, each of which is size x times KW rows by $N_{in}$ times 8/KW bits, with a read data output width from its sense amplifiers of W bits where W is a multiple of 8 and is as small as possible. Also for each switch unit, a connection memory is provided of size x times KR words by AW=$\log_2(N_{in} \times x)$ bits, or alternatively it may be size x words by KR×$\log_2(N_{in} \times x)$ bits. A ping pong write/read operation is performed, whereby a first RAM of each unit is written multiple times for x cycles while a second RAM in the unit is read multiple times for those x cycles, and then reversing this process so that for each of the next x cycles the first RAM is read multiple times while the second RAM is written multiple times. The multiple times for reading and writing are as follows. Over the course of a total of x cycles of write operation for one of the unit RAMs, using the $N_{in}$ by 8 bit write data bus as a source, each clock cycle is written with ($N_{in} \times 8$)/KW bits and each clock cycle/KW the write address is incremented. During the x cycles and with respect to the read operation of a RAM, each clock cycle W bits are read from the RAM KR times. This is achieved by providing the read address to the RAM by reading the connection memory KR times per clock cycle (alternatively read a wider connection memory once per clock cycle and multiplex its outputs KR times per cycle) and incrementing the read address of the connection memory once per cycle. For each of the KR outputs of the RAM, each W bits wide, those W bits are connected to output multiplexers to multiplex down the W bits to an 8-bit quantity to provide the data for a single one of KR output channels corresponding to the unit.

The preceding has demonstrated various alternatives included within the preferred embodiments. From these alternatives, one skilled in the art should appreciate numerous benefits they provide. For example, a random access memory switching structure is provided that operates to rapidly switch data from multiple input channels, each carrying interleaved data streams, to any one of a set of multiple output channels. Such a structure may be implemented with respect to various types of time slotted data, where each time slot is defined to accommodate an equal-sized data quantity (e.g., a byte). Such a structure may be used in various contacts, including optical communications and with different standards (e.g., SONET, SDH). Additionally, with the various aspects described above, an efficient device may be constructed, preferably by including multiple RAMs on a single integrated circuit, where that integrated circuit along with other related circuitry may then be used as a core for purposes of achieving the described switching functionality. Further, a greater efficiency in manufacturability as well as feasibility is achieved. Lastly, the numerous approaches provided above further demonstrate that while the present embodiments have been described in detail, various substitutions, modifications or alterations could be made to the descriptions set forth above without departing from the inventive scope which is defined by the following claims.

The invention claimed is:

1. A data switching circuit, comprising:
   at least one input for receiving during a same time period a plurality of data streams, wherein each of the data streams comprises a plurality of like-sized data quantities;
   a plurality of addressable memories, wherein each of the plurality of addressable memories comprises a plurality of memory cells;

circuitry for writing into each of the plurality of addressable memories a copy of a same set of data quantities provided by the data streams during a first period of time; and reading circuitry, coupled to each respective one of the plurality of addressable memories, for reading during a second period of time a number of data quantities from the respective addressable memory and outputting the read data quantities alternately to respective multiple output channels;

wherein M is an integer greater than one;

wherein each of the data streams consists of an integer number $N_{TS}$ of time slots;

wherein each of the plurality of addressable memories consists of a number of rows equal to $N_{TS}$ times M;

wherein the plurality of data streams consists of an integer number $N_{in}$ of data streams;

wherein each of the plurality of addressable memories consists of a number of columns equal to a rounded up integer of a quotient equal to $N_{in}$ divided by M;

wherein each of the plurality of addressable memories consists of an integer number $N_c$ of columns, the columns comprising the memory cells;

wherein the circuitry for writing writes data to each of the integer number $N_c$ of columns at a same time; and wherein the reading circuitry comprises:
sense amplifier circuitry; and
switching circuitry coupled between groups of the integer number $N_c$ of columns and the sense amplifier circuitry, wherein the switching circuitry is operable to select a subset of columns from each of the groups to which it is coupled and to provide signals from the selected subset to the sense amplifier circuitry.

2. The data switching circuit of claim 1 wherein the switching circuitry is operable, during a time period less than or approximately equal to the same time, to select a subset of columns from each of the groups to which it is coupled and to provide signals from the selected subset to the sense amplifier circuitry.

3. The data switching circuit of claim 1:
wherein the at least one input receives the plurality of data streams at a first frequency;
wherein each of the plurality of addressable memories comprises a like-number of rows, the rows comprising the memory cells; and
wherein the circuitry for writing into each of the plurality of addressable memories writes each of the rows at a frequency greater than the first frequency.

4. The data switching circuit of claim 1 wherein the plurality of addressable memories comprises a first plurality of addressable memories, and further comprising:
a second plurality of addressable memories having a same number of addressable memories as the first plurality of addressable memories; and
circuitry, operable at a same time as the reading circuitry coupled to each of the first plurality of addressable memories, for writing into each of the second plurality of addressable memories a copy of a same set of data quantities provided by the data streams over a third period of time; and
reading circuitry, coupled to each respective one of the second plurality of addressable memories and operable at a same time as the circuitry for writing into each of the first plurality of addressable memories, for reading, during a fourth period of time, a number of data quantities from the respective addressable memory and outputting the number of data quantities alternately to the respective multiple output channels.

5. The data switching circuit of claim 4 wherein each of the first and second plurality of addressable memories is formed on a same integrated circuit.

6. The data switching circuit of claim 1 wherein each of the plurality of addressable memories is formed on a same integrated circuit.

7. The data switching circuit of claim 1:
wherein each of the data streams consists of an integer number $N_{TS}$ of time slots;
wherein each of the time slots is for accommodating a respective one of the like-sized data quantities; and
wherein the reading circuitry is operable to output, during the second period of time, a number $N_{TS}$ of data quantities from each of the plurality of addressable memories and wherein the number $N_{TS}$ of data quantities represent a change in time order relative to a time order as the number $N_{TS}$ of data quantities arrived in one or more data streams.

8. The data switching circuit of claim 1:
wherein the at least one input receives the plurality of data streams at a first frequency;
wherein each of the plurality of addressable memories comprises a like-number of rows, the rows comprising the memory cells; and
wherein the circuitry for writing into each of the plurality of addressable memories writes each of the rows at a frequency greater than the first frequency.

9. A data switching circuit, comprising:
at least one input for receiving during a same time period a plurality of data streams, wherein each of the data streams comprises a plurality of like-sized data quantities;
a plurality of addressable memories, wherein each of the plurality of addressable memories consists of an integer number $N_c$ of columns, the columns comprising memory cells;
circuitry for writing into each of the plurality of addressable memories a copy of a same set of data quantities provided by the data streams during a first period of time, wherein the circuitry for writing writes data to each of the integer number $N_c$ of columns at a same time; and
reading circuitry, coupled to each respective one of the plurality of addressable memories, for reading during a second period of time a number of data quantities from the respective addressable memory and outputting the read data quantities alternately to respective multiple output channels, the reading circuitry comprising:
sense amplifier circuitry; and
switching circuitry coupled between groups of the integer number $N_c$ of columns and the sense amplifier circuitry, wherein the switching circuitry is operable to select a subset of columns from each of the groups to which it is coupled and to provide signals from the selected subset to the sense amplifier circuitry.

10. The data switching circuit of claim 9 wherein the switching circuitry is operable, during a time period less than or approximately equal to the same time, to select a subset of columns from each of the groups to which it is coupled and to provide signals from the selected subset to the sense amplifier circuitry.

11. The data switching circuit of claim 9 wherein the plurality of addressable memories comprises a first plurality of addressable memories, and further comprising:

a second plurality of addressable memories having a same number of addressable memories as the first plurality of addressable memories; and circuitry, operable at a same time as the reading circuitry coupled to each of the first plurality of addressable memories, for writing into each of the second plurality of addressable memories a copy of a same set of data quantities provided by the data streams over a third period of time; and reading circuitry, coupled to each respective one of the second plurality of addressable memories and operable at a same time as the circuitry for writing into each of the first plurality of addressable memories, for reading, during a fourth period of time, a number of data quantities from the respective addressable memory and outputting the number of data quantities alternately to the respective multiple output channels.

12. The data switching circuit of claim 11 wherein each of the first and second plurality of addressable memories is formed on a same integrated circuit.

13. The data switching circuit of claim 11 wherein each of the plurality of addressable memories is formed on a same integrated circuit.

14. A data switching circuit, comprising:

at least one input for receiving during a same time period a plurality of data streams, wherein each of the data streams comprises a plurality of like-sized data quantities;

a plurality of addressable memories, wherein each of the plurality of addressable memories comprises a plurality of memory cells;

circuitry for writing into each of the plurality of addressable memories a copy of a same set of data quantities provided by the data streams during a first period of time; and reading circuitry, coupled to each respective one of the plurality of addressable memories, for reading during a second period of time a number of data quantities from the respective addressable memory and outputting the read data quantities alternately to respective multiple output channels;

wherein each of the plurality of addressable memories consists of an integer number $N_c$ of columns, the columns comprising the memory cells;

wherein the circuitry for writing writes data to each of the integer number $N_c$ of columns at a same time; and wherein the reading circuitry comprises:
sense amplifier circuitry; and
switching circuitry coupled between groups of the integer number $N_c$ of columns and the sense amplifier circuitry, wherein the switching circuitry is operable to select a subset of columns from each of the groups to which it is coupled and to provide signals from the selected subset to the sense amplifier circuitry.

15. The data switching circuitry of claim 14 wherein the switching circuit comprises a plurality of multiplexers.

16. The data switching circuitry of claim 14 wherein the switching circuitry is operable, during a time period less than or approximately equal to the same time, to select a subset of columns from each of the groups to which it is coupled and to provide signals from the selected subset to the sense amplifier circuitry.

17. The data switching circuitry of claim 14:
wherein the at least one input receives the plurality of data streams at a first frequency;
wherein each of the plurality of addressable memories comprises a like-number of rows, the rows comprising the memory cells; and
wherein the circuitry for writing into each of the plurality of addressable memories writes each of the rows at a frequency greater than the first frequency.

18. The data switching circuit of claim 14 wherein the plurality of addressable memories comprises a first plurality of addressable memories, and further comprising:

a second plurality of addressable memories having a same number of addressable memories as the first plurality of addressable memories; and circuitry, operable at a same time as the reading circuitry coupled to each of the first plurality of addressable memories, for writing into each of the second plurality of addressable memories a copy of a same set of data quantities provided by the data streams over a third period of time; and reading circuitry, coupled to each respective one of the second plurality of addressable memories and operable at a same time as the circuitry for writing into each of the first plurality of addressable memories, for reading, during a fourth period of time, a number of data quantities from the respective addressable memory and outputting the number of data quantities alternately to the respective multiple output channels.

19. A method of switching data, comprising:

receiving during a same time period a plurality of data streams, wherein each of the data streams comprises a plurality of like-sized data quantities;

writing into each of a plurality of addressable memories, wherein each of the plurality of addressable memories comprises a plurality of memory cells, a copy of a same set of data quantities provided by the data streams during a first period of time; and reading during a second period of time a number of data quantities from respective ones of the addressable memories and outputting the read data quantities alternately to respective multiple output channels;

wherein M is an integer greater than one;
wherein each of the data streams consists of an integer number $N_{TS}$ of time slots;
wherein each of the plurality of addressable memories consists of a number of rows equal to $N_{TS}$ times M;
wherein the plurality of data streams consists of an integer number $N_{in\_1}$ of data streams;
wherein each of the plurality of addressable memories consists of a number of columns equal to a rounded up integer of a quotient equal to $N_{in}$ divided by M;
wherein each of the plurality of addressable memories consists of an integer number $N_c$ of columns, the columns comprising the memory cells;
wherein the writing step writes data to each of the integer number $N_c$ of columns at a same time; and
wherein the reading step comprises selecting a subset of columns from each of a plurality of groups to provide signals from the selected subset to sense amplifier circuitry.

* * * * *